United States Patent [19]

Hocking et al.

[11] Patent Number: 5,645,728
[45] Date of Patent: Jul. 8, 1997

[54] HYDROGEN PEROXIDE RECOVERY FROM COLORED AQUEOUS SOLUTIONS

[75] Inventors: Martin Blake Hocking, Victoria; David John Herbert, Vancouver, both of Canada

[73] Assignee: University of Victoria Innovation and Development Corporation, Victoria, Canada

[21] Appl. No.: 432,254

[22] Filed: May 1, 1995

[51] Int. Cl.⁶ ................................................ B01D 15/08
[52] U.S. Cl. ...................... 210/656; 210/635; 210/659; 210/198.2; 162/37; 162/38; 162/78
[58] Field of Search ..................... 162/6, 37, 38, 162/78; 210/635, 656, 659, 198.2

[56] References Cited

U.S. PATENT DOCUMENTS

| | | | |
|---|---|---|---|
| 3,652,407 | 3/1972 | Paleos | 210/27 |
| 3,987,641 | 10/1976 | Lee | 62/541 |
| 4,631,129 | 12/1986 | Heikkila | 210/635 |
| 4,822,681 | 4/1989 | Schossler | 210/656 |
| 4,995,983 | 2/1991 | Eadie et al. | 210/639 |
| 5,041,228 | 8/1991 | Herrmann | 210/656 |
| 5,215,665 | 6/1993 | Crofts et al. | 210/638 |

FOREIGN PATENT DOCUMENTS

987459  4/1976  Canada ................................. 210/656

Primary Examiner—Ernest G. Therkorn
Attorney, Agent, or Firm—Bull, Housser & Tupper

[57] ABSTRACT

A method of recovering hydrogen peroxide from colored aqueous solutions is disclosed. The solution is brought in contact with a non-ionic size-exclusion chromatography resin made up of packed particles having narrow, low molecular weight pores. The higher molecular weight colored constituents are largely excluded from the pores causing these constituents to be more rapidly eluted with water along the exterior of the particles. Hydrogen peroxide molecules are small enough to enter the pores several times in their passage through the resin which slows their progress sufficiently to cause elution of hydrogen peroxide after the colored constituents have been eluted, effectively resolving the two components.

14 Claims, 2 Drawing Sheets

HYDROGEN PEROXIDE RECOVERY FROM COLORED AQUEOUS SOLUTIONS

FIELD OF THE INVENTION

This invention relates generally to the recovery of hydrogen peroxide ($H_2O_2$) from colored aqueous solutions and more particularly is concerned with a method of separating hydrogen peroxide from colored constituents in an aqueous solution using non-ionic, size exclusion chromatography.

BACKGROUND OF THE INVENTION

Hydrogen peroxide, as a strong oxidizing agent, has been commonly used as a bleaching agent of pulp used in the paper industry and to bleach textiles. Hydrogen peroxide is particularly suited to bleaching applications because, unlike most other bleaching chemicals, it lends itself well to continuous processing, has no severe toxicity problems, is virtually noncorrosive and causes a minimum of effluent problems.

Hydrogen peroxide has been found to be particularly useful in the bleaching of mechanical pulps where most of the lignin is retained in the pulp and where high brightness values are not critical. Bleached groundwood pulp of relatively high quality, with respect to cleanliness, brightness and brightness stability result with hydrogen peroxide bleaching. It has been found that the most efficient bleaching action is obtained when the proportion of reagents to pulp is sufficient to achieve a residual hydrogen peroxide content in the spent liquor of about 25% to 50% of that originally present. This represents a substantial concentration of hydrogen peroxide in the spent liquor and recovery and re-utilization of this hydrogen peroxide is becoming increasingly important to the pulp and paper industry.

Such recovery and re-utilization would promote increased efficiency of hydrogen peroxide use, reduce the cost of waste effluent treatment and reduce the flow of waste hydrogen peroxide discharged into the environment, or the chemical costs of neutralizing it before discharge.

In the past steps have been taken to use this spent liquor again by contacting it with fresh unbleached pulp. This achieves some brightening benefit but the presence of colored constituents in this partially active spent liquor makes it far less effective in its bleaching ability as compared to an equivalent mass of fresh, colourless hydrogen peroxide. Consequently, there is a need for a simple, inexpensive method for separating colored constituents from an aqueous hydrogen peroxide solution to enable the hydrogen peroxide to be used more efficiently in the bleaching process. As well, other processes employing hydrogen peroxide may benefit from this method including processes relating to the production and purification of hydrogen peroxide for sale and use as such.

As well, a significant number of chemical pulp bleach plants have adopted a final peroxide bleaching stage. The hydrogen peroxide stage permits stabilization of the brightness value to a maximum degree and reduces the discharge of harmful chorine derivatives into the environment. The present invention may also be used to permit re-use of this spent hydrogen peroxide solution.

In the past several methods have been devised to separate aqueous hydrogen peroxide from these colored constituents, including:

1. Liquid-liquid extraction

Liquid-liquid extraction using an immiscible solvent with a relatively high (favourable) partition coefficient may be used. However, such extraction can only give relatively poor recoveries. For example, extraction of each of two 25 mL portions of 1% and 10% aqueous hydrogen provide with five 10 mL portions of ethyl acetate gave only 20% and 26% total recoveries of hydrogen peroxide from the aqueous phases, respectively.

In a second example, 25 mL of spent bleaching liquor containing 3.30 g/L (ca. 3.3% by weight) hydrogen peroxide was neutralized to pH 7.1 with hydrochloric acid and saturated with sodium chloride. This specifically optimized spent liquor, when extracted with six 12 mL portions of ethyl acetate, gave a 21% recovery of the residual peroxide.

2. Column chromatographic recovery

Silica gel column chromatography can be used to trap aqueous hydrogen peroxide. The hydrogen peroxide can subsequently be eluted using ethyl acetate, using 17 to 40 times the solvent volume as compared to the original aqueous solution volume. Even though 94 to 98% peroxide recoveries were obtained, the extravagant solvent volumes required and safety considerations make this method unattractive.

3. Column chromatography with prior freeze concentration

Freeze concentration of spent liquor by itself concentrates both hydrogen peroxide and colour in the liquid oil obtained from freezing out much of the water as ice. The column chromatographic stage effectively separates the hydrogen peroxide from colored impurities in the oil, but still requires solvent elution for efficient hydrogen peroxide recovered from the column when silica gel is used as the solid phase. When this method was scaled up and applied to real spent bleaching liquor, only about ⅔ of the residual hydrogen peroxide was recovered.

4. Precipitation of peroxide with lime

The early textile literature teaches that hydrogen peroxide may be precipitated as calcium peroxide, from aqueous solutions by treating with quicklime (CaO). When tested with spent bleaching liquor, the colour largely came down with the precipitated calcium peroxide. Thus this method is of little value for colour removal from hydrogen peroxide.

5. Complexation—extraction with bridged nitrogen heterocycles

This method is moderately effective, but employs expensive, quite toxic components which reduce the practicality of using it on a large scale.

SUMMARY OF ALTERNATIVES

Thus, liquid-liquid extraction permits only low recoveries. Column chromatography gives good recoveries on a small scale, but when the procedure is scaled up, recoveries get poorer, and this procedure requires the employment of flammable and expensive solvents. Freeze concentration combined with column chromatography is a technique which gives somewhat unpredictable results and at the same time confers additional technical complexity (additional stages) and cost to the recovery process. The lime precipitation option is a two stage recovery procedure, which fails to give good differentiation of peroxide from colour. Complexation-extraction is effective, but the expensive, quite toxic reagent required makes this method impractical on a large scale.

The inventors are aware of the following patents which are, more or less, relevant to this invention.

Canadian patent number 987,459 to Broddevall, et al discloses a method of purifying lignin-containing effluents, with primarily application to chemical pulp mill effluents. In particular the method disclosed is used to remove lignin and lignin derivatives from, and thereby purify, chemical pulp mill waste streams. This is done by bringing the waste stream in contact with a porous and granular phenolic resin which absorbs the lignin and lignin derivatives. The resin is then regenerated for re-use to recover the lignin and lignin derivatives for disposal.

Such a method differs from the present invention in several significant way including the following:
  a. the patented method is primarily for dealing with removal for destruction of lignin and lignin derivatives from bleach waste streams of a pulp bleaching plant, not for recovery of a useful substance, hydrogen peroxide, from bleach waste streams;
  b. an anion exchange resin is used in the patented process to capture the lignin and lignin derivatives through anionic attraction of the resin. The present invention uses a non-ionic resin which relies on size exclusion to separate the constituent elements; and
  c. the patented method requires the further step of eluting the resin (usually with aqueous sodium sulphate) in order to regenerate the resin by washing out the lignin and lignin extracts trapped in the resin.

U.S. Pat. No. 3,652,407 to Paleos discloses a method of removing colour from a pH-adjusted bleach waste stream by applying an essentially non-ionogenic macroreticular resin. According to the method disclosed, colored bodies enter large cavities and become entrapped therein. Regeneration of the resin is required by means of an aqueous sodium hydroxide solution.

The patented method differs from the subject method in at least the following respects:
  a. the patented method relies on colored constituents entering large, generally poorly defined cavities of a macroreticular resin, and not the specifically defined size exclusion pores which permit hydrogen peroxide to enter into one end of the pore and exit from the same or the other end, and exclude colored constituents; and
  b. the patented method requires the use of an aqueous sodium hydroxide solution for absorbent regeneration, as compared to regeneration with pure water as in the subject invention.

SUMMARY OF THE INVENTION

The present invention provides a method for removing colored constituents from an aqueous hydrogen peroxide solution. The solution is brought in contact with a non-ionic size exclusion chromatography resin. The resin is made up of packed particles having narrow, low molecular weight pores. In practice the higher molecular weight colored constituents are largely excluded from the pores causing these constituents to be more rapidly eluted with water along the exterior of the particles. Hydrogen peroxide molecules are small enough to enter the pores several times in their passage through the resin which slows their progress sufficiently to cause elution of hydrogen peroxide after the colored constituents have been eluted. After the hydrogen peroxide has been eluted, the resin is effectively regenerated and ready for a further addition of colored aqueous hydrogen peroxide solution for separation. Water is used to elute the hydrogen peroxide from the resin.

This method provides a relatively inexpensive, safe and simple method of removing the colored and other higher molecular weight constituents from the aqueous hydrogen peroxide solution. The packed column is regenerated through elution with water only. The aqueous hydrogen peroxide solution resulting from elution according to this method may be re-used in the bleaching of wood pulps, either directly, or preferably, following conventional processes to concentrate the hydrogen peroxide in the aqueous solution. This method may also be adapted to other processes in which aqueous hydrogen peroxide is or becomes contaminated with relatively high molecular weight impurities.

According to the invention a method is provided for separating colored constituents from hydrogen peroxide in a colored aqueous hydrogen peroxide solution, said solution containing colored constituents having a higher molecular weight relative to hydrogen peroxide. This method comprises the steps of:

(a) introducing a batch of the colored aqueous hydrogen peroxide solution into a mass of size exclusion media. The media is made up of particles having a plurality of pores through each particle. The pores are sufficiently large to permit hydrogen peroxide to pass through the pores and the pores are also sufficiently small to substantially prevent or delay the passing of the colored constituents through the pores; and (b) introducing a flow of liquid into the media to elute the colored aqueous hydrogen peroxide solution through the media.

The liquid may be water which is, preferably, distilled and deionized. The media may be tightly packed in a chromatographic column before the solution has passed through. The particles may be spherical in shape. The solution may be received from the bleaching plant of a pulp mill.

The molecular size accepted by the pores may be a maximum of about $10 \times 16^6$ Daltons or smaller. The particles may be FRACTOGEL TSK; and may either be S-type or F-type.

In addition, an apparatus for recovering hydrogen peroxide from a colored aqueous solution, said solution containing relatively high molecular weight colored constituents, is provided according to the invention. The apparatus includes:

(a) the chromatography column;

(b) means for introducing a flow of aqueous hydrogen peroxide solution containing such colored constituents into one end of said column;

(c) means for eluting said flow through said column;

(d) impeding means within said column, responsive to the difference between the molecular weight of the colored constituents and the molecular weight of the hydrogen peroxide, for impeding the flow of hydrogen peroxide through said column relative to the flow of colored constituents through said column;

(e) means for receiving the flow of said solution from the other end of said column and for collecting the aqueous hydrogen peroxide solution separately from the colored constituents.

DETAILED DESCRIPTION OF THE PREFERRED EMBODIMENTS OF THE INVENTION

The following method for separating colored constituents from an aqueous hydrogen peroxide solution has a number of useful applications. While the preferred embodiment hereafter described relates to separation of colored constituents from an aqueous hydrogen peroxide waste stream from an hydrogen peroxide groundwood pulp bleaching plant, it is to be understood that the present invention may be used in various applications to separate colored or other higher molecular weight constituents from hydrogen peroxide. For example, the present invention may be used to separate such constituents from an aqueous hydrogen peroxide waste stream from a chemical bleaching plant or from a textile bleaching plant, and may be used to remove such constituents from processes related to the manufacture and purification of hydrogen peroxide itself. As well, with modifications as would be apparent to one skilled in the art, the present invention may be used to remove high molecular constituents, colored or otherwise, from aqueous hydrogen peroxide waste streams from other processes in which aqueous hydrogen peroxide is employed.

Figure 1:
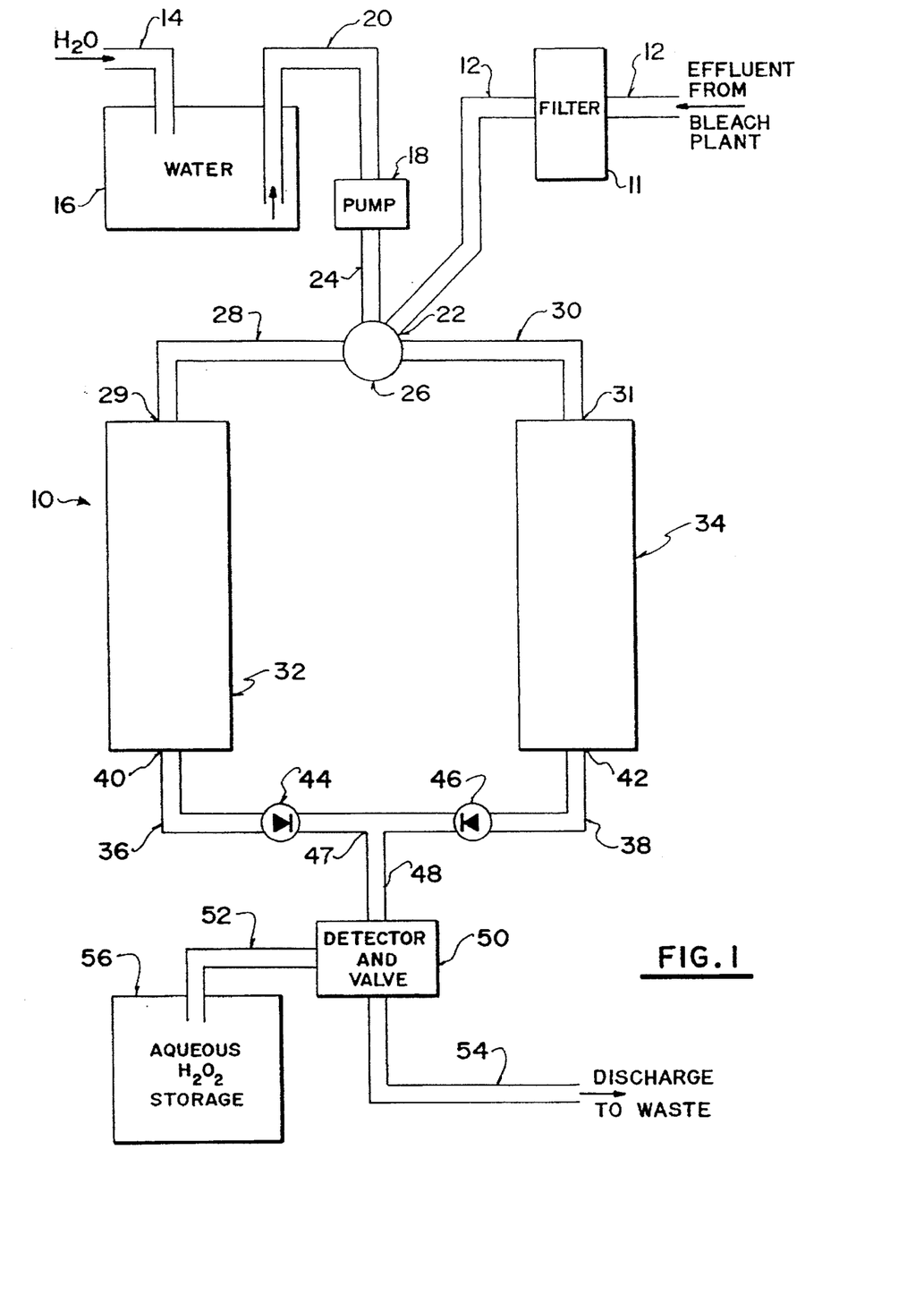
FIG. 1 is a schematic diagram depicting the method of separating colored constituents from hydrogen peroxide in accordance with the present invention.

Referring now to FIG. 1 a simplified schematic diagram depicts an apparatus according to the preferred embodiment as applied to the waste stream of an hydrogen peroxide groundwood pulp bleach plant, which apparatus is shown generally at 10. The effluent stream from the pulp bleach plant enters inlet conduit 12. Distilled water, steam condensate, or deionized water enters conduit 14 and is stored in water storage tank 16. Pump 18 causes water in tank 16 to move through conduit 20, pump 18 and conduit 24 to valve 26. The effluent stream flows through conduit 12 and through filter 11 and enters valve 26 at joint 22. Filter 11 is a replaceable cartridge type filter to remove particulate matter to reduce the risk of this matter interfering with fluid flows through columns 28 and 30.

Valve 26 joins conduit 24 to column inlet conduit 28 and column inlet conduit 30 to alternate the flow of water therethrough. Valve 26 is preset to alternate for a predetermined time period between a first position, wherein effluent from conduit 12 flows into conduit 28 while water from conduit 24 flows into conduit 30, and a second position wherein effluent from conduit 12 flows into conduit 30 while water from conduit 24 flows into conduit 28. In this way, water from conduit 24 and effluent from conduit 12 flow alternately through valve 26 into conduit 28 and into conduit 30.

Each of conduits 28 and 30 joins respective gel permeation chromatographic columns 32 and 34. Columns 32 and 34 are each packed with gel permeation particles (not shown) formed in spherical beads. Said particles permit water flow through the interstitial spaces between particles and also through pores which permeate each particle. The pores are small enough to prevent or delay entry of the large molecular weight colored constituents through the pores, in so doing permitting rapid elution of these large molecular weight constituents out of the column. The pores are also large enough to permit hydrogen peroxide to enter the pores, which will occur many times on the passage of each hydrogen peroxide molecule through the column. The hydrogen peroxide molecules diffuse through the particles and spend a longer time within the particles, as compared to the higher molecular weight colored constituents, which do not. The colored constituents move more rapidly through, and are thereby separated from the hydrogen peroxide and elute through columns 32 and 34 before the hydrogen peroxide.

Exit conduits 36 and 38 are joined to respective discharge ends 40 and 42 of columns 32 and 34. Conduits 36 and 38 include respective check valves 44 and 46 which prevent back flow of liquid in conduits 36 and 38. Conduits 36 and 38 are joined to conduit 48 at joint 47.

Detector 50 is connected to conduit 48 to detect the composition of the effluent stream flowing through conduit 48. Detector 50 includes a valve (not shown) which is switchable by detector 50 between a first position which causes the flow of effluent stream from conduit 48 to flow through conduit 52 and a second position which causes the flow of effluent stream from conduit 48 to flow through conduit 54 to be discharged.

Detector 50 switches to the first position when a predetermined concentration of aqueous hydrogen peroxide is detected in the flow of solution. Storage tank 56 is connected to the end of conduit 52 to accept and store solution from conduit 52. When detection of flow of hydrogen peroxide ceases, detector 50 causes the valve to move to its second position to connect with conduit 54.

The aqueous hydrogen peroxide solution recovered in tank 56 may be re-used to bleach further groundwood pulp by addition of make-up, of more concentrated stock hydrogen peroxide, to establish the initial concentrations normally used in the hydrogen peroxide liquor before it contacts the pulp. Or it may be concentrated for re-use in the groundwood pulp bleaching process, using known techniques.

The operation of the preferred embodiment will now be discussed with reference to FIG. 1.

When in its operational state water continuously flows through apparatus 10 as follows. Pure water enters apparatus 10 through conduit 14 to tank 16 where it is stored for use. Pump 18 draws water from tank 16 through conduit 20 and sends it via conduit 24 to valve 26. Valve 26 alternately controls water flows through to conduit 28 and to conduit 30. Water then alternately enters respective inlet ends 29 and 31 of columns 32 and 34 and flows alternately through each column. Water flows between the interstitial spaces between the particles in the column and also moves through the pores permeating the particles. The water flows out through respective outlet ends 40 and 42 of columns 32 and 34 in turn, into conduits 36 and 38 respectively. Check valves 44 and 46 permit water-flowing in conduits 36 and 38 to move past valves 44 and 46 towards joint 47. These check valves prevent water or other solutions from moving past the check valves in the direction of ends 40 and 42. The water flow from both conduits 36 and 38 flows into conduit 48 past detector 50. If detector 50 does not detect the predetermined threshold concentration of hydrogen peroxide in the water solution, a valve (not shown) directs the flow of water out through conduit 54 to be discharged.

The colored hydrogen peroxide solution enters apparatus 10 through conduit 12 and is directed through filter 11 and joint 22 to valve 26. Valve 26 is pre-set 35 to alternate flow of colored hydrogen peroxide solution from conduit 12 between conduit 28 and conduit 30, and the flow of water from conduit 24 between conduit 30 and conduit 28. A batch of colored hydrogen peroxide effluent flows through conduit 28 into column 32 by way of inlet end 29. After a predetermined volume of colored hydrogen peroxide effluent is passed through column 32, valve 26 switches and water under pressure from pump 18 elutes the colored hydrogen peroxide solution through column 32. The high molecular weight colored constituents travel between the interstitial spaces between the particles in column 32. The hydrogen peroxide molecules are small enough to enter the pores several times and are slowed in their travel through column 32. As a consequence, a solution of aqueous colored constituents is eluted before an aqueous hydrogen peroxide solution, essentially resolving the two components of the effluent stream. These two solutions, in turn, flow through check valve 44 into conduit 48 to detector 50. The concentration of hydrogen peroxide in solution is initially negligible or at least below the pre-determined threshold concentration. The flow of solution is therefore directed into conduit 54 and discharged. When the pre-determined threshold concentration of hydrogen peroxide is detected by detector 50 a valve (not shown) is switched to direct flow of solution into conduit 52 and into tank 56 for storage. When the concentration of hydrogen peroxide becomes negligible again or falls below a predetermined level, a valve (not shown) is switched to direct residual water to waste to avoid undue dilution of the recovered hydrogen peroxide.

Similarly, valve 26 alternates to cause a batch of colored hydrogen peroxide solution to be eluted through column 34. The solution is resolved into a solution of colored constituents which elutes before an hydrogen peroxide solution. These solutions flow through conduit 38, check valve 46 prevents flow of solution into conduit 36 towards end 40. Detector 50 permits the solution to be discharged through conduit 54. When a threshold concentration of hydrogen peroxide in solution is detected by detector 50, a valve moves to direct flow of solution into conduit 52 and into storage tank 56.

Figure 2:
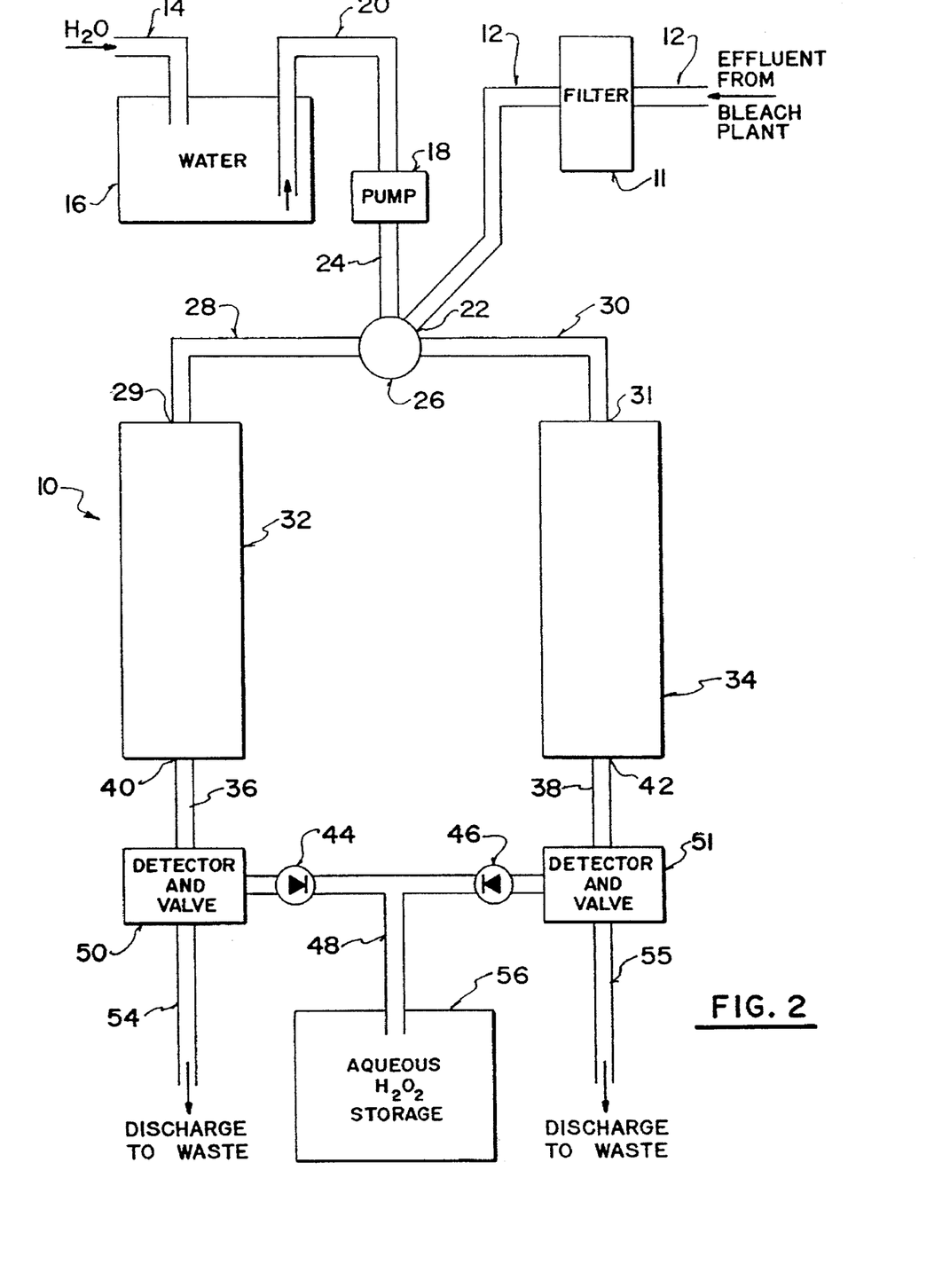
FIG. 2 is a schematic diagram depicting an alternate method of separating colored constituents from hydrogen peroxide in accordance with the present invention.

Greater continuity and flexibility of operation of apparatus 10 may be achieved by employing two detectors, as illustrated in FIG. 2. In this embodiment, column 32 can be made to discharge colored, peroxide-free effluent through detector 50 to waste via conduit 54, at the same time as column 34 is operated to discharge separated hydrogen peroxide through detector 51 via conduit 48 into the peroxide storage tank 56. The operating phase (inlet and outlet) of each of columns 32 and 34 is then switched, so that column 32 is made to discharge recovered colourless hydrogen peroxide via detector 50 to the peroxide storage tank 56, while the colored effluent, free of peroxide from column 34, is discharged via detector 51 to waste through conduit 55.

In another embodiment, information from the detector could be used to program not only the routing of the column eluates, but also the alternation of yellow bleach effluent and fresh water into the inlet sides of the columns. Detector operation can be based on hydrogen peroxide detection using well known electrochemical principles, in which case the detected stream would be directed to hydrogen peroxide storage. Or, it could employ an ultraviolet absorbance principle by using a suitable cell placed in the path of an ultraviolet beam of one or more frequencies selected so as to be strongly absorbed by the yellow colored higher molecular weight impurities present in the bleach plant effluent and not absorbed by aqueous hydrogen peroxide. Detection of colored material, in this version, would mean that the detected stream would be diverted to waste. Each type of detector is relatively inexpensive, so that provision of a detector for each operating column is not impractical.

The flow and elution of colored hydrogen peroxide effluent solution is thereby alternated between columns 32 and 34. Water flow also alternates between columns 32 and 34 to recharge each column after a batch of colored hydrogen peroxide solution has been eluted. Ordinarily each column will be ready to accept a new batch of colored hydrogen peroxide effluent immediately after elution of the hydrogen peroxide component. If needed, 5 for larger treatment volumes or for greater continuity in operation without interruption, further columns may be added in parallel to separate the colored constituents from the hydrogen peroxide in solution. Greatest operating flexibility is obtained by employing a separate detector 50 for each column.

A more complete understanding of the present invention may be obtained by referring to the following illustrative examples of the practice of the invention, which examples are not intended, however, to restrict the limits of the invention to the conditions described.

EXAMPLE 1

PEROXIDE CONTENT AND SOLIDS RECOVERY FROM SILICATE PULP FILTRATE

A 20.0 mL sample of one week old silicate-stabilized pulp filtrate directly from a ground wood bleach plant, with a pH of 9.31, hydrogen peroxide content of 2.55 g/L and total solids of 20.3 g/L, was subjected to gel permeation hromatography using 200 g of BDH Fractogel TSK 40-F (E. Merck, Darmstadt, West Germany) (100–10,000 Daltons) in distilled, deionized water and packed into a 1.50 cm (internal diameter) glass column which gave a bed height of 46 cm. Elution of the column with distilled, deionized water (flow rate 1.58 mL/min at 5 psi $N_2$) gave ten fractions. The volume, pH, colour, residue weight after freeze evaporation, and hydrogen peroxide content of these fractions are as follows:

| Fraction | Volume, mL | pH | Colour | $H_2O_2$, mg | Solids, mg |
|---|---|---|---|---|---|
| 1 | 20 | 7.73 | clear | — | — |
| 2 | 20 | 8.77 | clear | — | — |
| 3 | 20 | 7.29 | yellow | — | } 68.8 |
| 4 | 13.5 | 7.49 | yellow | — | |
| 5 | 20 | 9.73 | faint yellow | — | } 199 |
| 6 | 20 | 8.71 | faint yellow | 0.34 | |
| 7 | 20 | 9.26 | clear | } 48.4 | } 7.36 |
| 8 | 20 | 8.94 | clear | | |
| 9 | 20 | 8.32 | clear | — | } 3.60 |
| 10 | 20 | 8.73 | clear | — | |

Aliquots of fractions 6, 7, and 8 were titrated and these fractions were shown to contain a total of 48.7 mg of hydrogen peroxide which represents 95.5% of the hydrogen peroxide present in the original 20.0 mL of pulp filtrate. Entire or representative amounts of fractions 3 through 10 (in groups of two fractions i.e. 3+4, 5+6, etc.) were freeze evaporated in order to determine the total solids, 279 mg, which represents 68.7% of the total solids present in the original 20.0 mL of pulp filtrate. The physical properties of the recovered solids from the two groups of yellow fractions are given below.

| | Fractions 3 and 4 | Fractions 5 and 6 |
|---|---|---|
| Melting point: | >360° C., charring 170–360° C. | >360° C., charring 200–360° C. |
| Infrared: $cm^{-1}$ | 3450 s broad, OH<br>1610 s broad, C = O<br>1400 m broad<br>1100 s broad | 3450 s broad, OH<br>1580 s, broad, C = O<br>1430 s<br>920 m, 880 w, 830 m<br>640 m, 610 w |
| MS, solid | m + 1 at 69; m + 29 at 97 | m + 1 at 243; m + 29 at 271 |

| inlet, C.I. | m + 1 at 97; m + 29 at 125 | m + 1 at 257; m + 29 at 285 |
|---|---|---|
| Analysis: | Found, % | Found, % |
| (Vacuum dried at 65° C.) | C 24.86<br>H 2.83<br>N 0.33 | C 25.41<br>H 2.86<br>N <0.05 |

The mass spectra were obtained by heating a solid sample of the material from ambient to high temperatures and recording spectra when appropriate. The table contains mass spectral data for fractions 3 and 4 obtained at a probe temperature of 400° C. Mass spectra for fractions 5 and 6 were recorded at a number of different temperatures, 150° C., 250° C., and 350° C. The information in the above table is from the spectrum recorded at a probe temperature of 150° C. The two higher probe temperature spectra were quite similar to each other but different from the lower probe temperature spectrum.

EXAMPLE 2

PEROXIDE AND SOLIDS RECOVERY FROM FREEZE-CONCENTRATED YELLOW OIL FRACTIONS

A 10.0 mL sample of day old freeze concentrated yellow oil pH=9.08, hydrogen peroxide content of 11.14 g/L, and total solids of 44.3 g/L, was subjected to gel permeation chromatography using 200 g of BDH Fractogel TSK 40-F (E. Merck, Darmstadt, West Germany) (100–10,000 Daltons) in distilled, deionized water and packed into a 1.50 cm (internal diameter) glass column which gave a bed height of 53 cm. Elution of the column with distilled, deionized water (flow rate 2.90 mL/min) gave seventeen fractions. The volume, pH, colour, residue weight after freeze evaporation, and hydrogen peroxide content of these fractions are given below:

| Fraction | Volume, mL | pH | Colour | $H_2O_2$, mg | Solids, mg |
|---|---|---|---|---|---|
| 1 | 10 | 8.21 | clear | — | |
| 2 | 10 | 8.13 | clear | — | |
| 3 | 10 | 8.00 | clear | — | 12.2 |
| 4 | 10 | 7.81 | clear | — | |
| 5 | 10 | 6.96 | f yellow | — | 59.8 |
| 6 | 10 | 6.93 | yellow | — | |
| 7 | 10 | 6.91 | f yellow | — | |
| 8 | 10 | 9.84 | f yellow | — | |
| 9 | 10 | 10.49 | f yellow | — | 503.9 |
| 10 | 10 | 8.69 | f yellow | — | |
| 11 | 10 | 8.17 | f yellow | + | |
| 12 | 10 | 8.14 | clear | + | |
| 13 | 10 | 8.38 | clear | +++ | |
| 14 | 10 | 8.24 | clear | ++ | 14.5 |
| 15 | 10 | 8.23 | clear | + | |
| 16 | 10 | 8.23 | clear | — | 8.4 |
| 17 | 10 | 8.22 | clear | — | |

The seventeen fractions were combined into five groups: group I, fractions 1 through 4; group II, fractions 5 and 6; group III, fractions 7 through 11; group IV, fractions 12 through 15; group V, fractions 16 and 17. Each group was freeze evaporated to determine its solids content and the total recovered solids, 608 mg, represents 138% of the original solids. The physical properties of the isolates from the freeze concentration of some of the various groups are given as follows:

| | Group | | | | |
|---|---|---|---|---|---|
| | I | II | III | IV | V |
| Melting point | | | | | |
| | 360° C., charring 270–360° C. | | | 300° C., charring 270–300° C. | |
| Infrared cm$^{-1}$ | | | | | |
| | 3400 m, broad<br>3420 m, broad | 3400 s, broad | 3400 s, broad | 3380 s, broad | |
| | 1600 m | 1600 s, broad | 1560 s | 1580 s, broad | 1600 w |
| | 1445 s | 1440 s | 1420 s | 1390 m, broad | 1460 w |
| | 1150 m | 1060 m, broad | 1120 m | 1260 m | |
| | 880 m | | 920 m, 830 m<br>87 5 w, 760 m<br>640 m | 1125 m<br>1030 m | |
| MS, solid inlet, C.I. | | | | | |
| | | m + 1 at 267<br>m + 29 at 295 | | | |
| Analysis (vacuum dried at 65° C.) | | | | | |
| | Found, % | | | Found, % | |
| | C 36.69 | | | C 28.15 | |
| | H 3.84 | | | H 2.93 | |
| | N 0.89 | | | N 0.19 | |

The mass spectra of the recovered solid from Group II were recorded at two probe temperatures, 100° C. and 400° C. The mass spectra of Groups III and IV were recorded at probe temperatures of 300° C.

EXAMPLE 3

A 5.00 mL sample of day old freeze concentrated yellow oil, hydrogen peroxide content of 10.63 g/L, was subjected to size exclusion chromatography using 200 mL of BDH Fractogel TSK 40-F (E. Merck, Darmstadt, West Germany) (100–10,000 Daltons) in distilled, deionized water and packed into a 1.50 cm i.d. glass column which gave a bed height of 46 cm. Elution of the column with distilled deionized water (flow rate 1.91 mL/min, 6 psi $N_2$) gave twenty-seven fractions. The volume, pH, colour, and peroxide content of these fractions are given on the following page. Various groups of fractions, 9 and 10, were combined and freeze evaporated to recover any solids present.

| Fraction | Volume, mL | pH | Colour | $H_2O_2$, mg | Solids, mg |
|---|---|---|---|---|---|
| 1 | 5.2 | 8.04 | clear | — | — |
| 2 | 5.1 | 7.87 | clear | — | — |
| 3 | 5.1 | 7.75 | clear | — | — |
| 4 | 5.0 | 7.37 | clear | — | — |
| 5 | 5.0 | 7.36 | clear | — | — |
| 6 | 5.0 | 7.33 | clear | — | — |
| 7 | 5.0 | 7.24 | clear | — | — |
| 8 | 4.9 | 7.03 | clear | — | — |
| 9 | 5.0 | 7.53 | yellow | — | 34.1 |
| 10 | 5.2 | 7.38 | yellow | — | |
| 11 | 5.0 | 7.29 | f yellow | — | 28.2 |
| 12 | 5.0 | 7.22 | f yellow | — | |
| 13 | 4.9 | 7.07 | f yellow | — | |

-continued

| Fraction | Volume, mL | pH | Colour | H₂O₂, mg | Solids, mg |
|---|---|---|---|---|---|
| 14 | 5.0 | 7.14 | f yellow | — | } 29.0 |
| 15 | 5.0 | 10.62 | f yellow | — | } 60.6 |
| 16 | 5.0 | 10.74 | f yellow | — | |
| 17 | 5.0 | 9.45 | clear | — | } 27.1 |
| 18 | 5.0 | 9.00 | f yellow | — | |
| 19 | 5.0 | 8.89 | f yellow | — | } 214.1 |
| 20 | 5.0 | 8.70 | f yellow | — | |
| 21 | 1.5 | 8.87 | clear | 0.3 | — |
| 22 | 5.0 | 9.13 | clear | 1.3 | — |
| 23 | 5.2 | 9.16 | clear | 5.7 | — |
| 24 | 5.0 | 9.24 | clear | 23.1 | — |
| 25 | 5.7 | 9.21 | clear | 20.4 | — |
| 26 | 5.0 | 9.02 | clear | 0.9 | — |
| 27 | 5.0 | 9.03 | clear | 0.2 | — |

The total hydrogen peroxide recovered from the column, 51.8 mg, represents 97.4% of the peroxide present in the original sample. Also, almost 90% of the peroxide was obtained in three fractions, 23, 24, and 25. These three fractions have a total volume of 15.9 Ml and the original sample volume was 5.00 mL.

EXAMPLE 4

Two, 20.0 mL portions of freeze-concentrated yellow oil, hydrogen peroxide content of 23.63 g/L, and total solids of 136.4 g/L, were separately chromatographed using 400 g of BDH Fractogel TSK 40-F (E. Merck, Darmstadt, West Germany) (100–10,000 Daltons) in distilled, deionized water and packed into a 2.20 cm i.d. glass column which gave a bed height of 73 cm. Elution of the column with distilled, deionized water (first portion; at a flow rate of 2.0 mL/min at 7.5 psi N2 and second portion; at a flow rate of 1.71 mL/min at 7.5 psi $N_2$). The volume, pH, colour, and hydrogen peroxide content of the fractions from each chromatography as follows:

| First Portion (4 day old) | | | | |
|---|---|---|---|---|
| Fraction | Volume, mL | pH | Colour | H₂O₂, mg |
| 1 | 100 | 8.31 | clear | — |
| 2 | 10.6 | 8.32 | f yellow | — |
| 3 | 20 | 7.18 | yellow | — |
| 4 | 20 | 6.90 | yellow | — |
| 5 | 16 | 7.02 | yellow | — |
| 6 | 20 | 7.14 | f yellow | — |
| 7 | 20 | 7.40 | f yellow | — |
| 8 | 20 | 10.96 | f yellow | — |
| 9 | 15 | 10.44 | f yellow | — |
| 10 | 20 | 9.40 | f yellow | — |
| 11 | 20 | 8.77 | f yellow | 51.0 |
| 12 | 15.2 | 8.52 | f yellow | 84.0 |
| 13 | 20 | 8.66 | f yellow | 110.5 |
| 14 | 21 | 8.33 | f yellow | 148.2 |
| 15 | 25 | 8.21 | clear | 70.1 |
| 16 | 20 | 8.16 | clear | — |

Aliquots of fractions 11 to 15, inclusive, were titrated and were shown to contain a total of 463.8 mg of hydrogen peroxide. This represents 98.1% of the hydrogen peroxide present in the original 20.0 mL of pulp filtrate.

Second Portion (5 day old)

| Second Portion (5 day old) | | | | |
|---|---|---|---|---|
| Fraction | Volume, mL | pH | Colour | H₂O₂, mg |
| 1 | 100 | 8.02 | clear | — |
| 2 | 25 | 7.20 | yellow | — |
| 3 | 19 | 6.92 | yellow | — |
| 4 | 17 | 6.80 | yellow | — |
| 5 | 22 | 6.72 | f yellow | — |
| 6 | 20 | 6.65 | f yellow | — |
| 7 | 20 | 10.84 | f yellow | — |
| 8 | 20 | 10.41 | f yellow | — |
| 9 | 16 | 8.79 | f yellow | — |
| 10 | 10 | 8.60 | f yellow | 2.6 |
| 11 | 10 | 8.59 | f yellow | 26.4 |
| 12 | 20 | 8.47 | f yellow | 62.9 |
| 13 | 20 | 8.19 | f yellow | 88.4 |
| 14 | 20 | 8.07 | clear | 198.9 |
| 15 | 20 | 7.92 | clear | 64.6 |
| 16 | 10 | 7.32 | clear | 0.9 |
| 17 | 7.6 | 7.32 | clear | — |

Aliquots of fractions 10 to 16 inclusive were titrated and were shown to contain a total of 444.7 mg of hydrogen peroxide which represents 94.1% of the hydrogen peroxide present in the original 20.0 mL of pulp filtrate. Fractions 13 and 14 from both the above chromatography were combined and used to prepare the peroxide brightening solution used in Example 7. Various fractions from the first and second chromatography of the yellow oil were combined into three groups: group I; fractions 2 to 5 and fractions 2 to 4 respectively, group II; fractions 6 to 8 and fractions 5 to 7 respectively, group III; fractions 9 to 12 and fractions 8 to 12 respectively. Aliquots of each group were freeze evaporated to dryness. Selected physical properties of the various groups are given below.

| Group | | |
|---|---|---|
| I | II | III |
| Melting point | | |
| 300° C. char | 300° C. char | 300° C. char |
| | Infrared cm⁻¹ | |
| 3400 s, broad | 3400 s, broad | 3420 m, broad |
| 1600 s, broad | 1580 s, broad | 1570 s, broad |
| 1400 s | 1400 s | 1420 s |
| 1055 m | 1100 m | 1040 m |
| | | 1005 m |
| | | 920 m, 825 m |
| | | 760 m, 690 m |
| | | 460 m |

EXAMPLE 5

SIZE EXCLUSION CHROMATOGRAPHY OF pH ADJUSTED SILICATE PULP FILTRATE

A 25.0 mL sample of silicate-stabilized pulp filtrate directly from a groundwood bleach plant, with hydrogen peroxide content of 3.03 g/L and pH of 9.57, was acidified with 10% hydrochloric acid to a pH of 7.75 and then subjected to size exclusion chromatography using 400 g of BDH Fractogel TSK 40-F (E. Merck, Darmstadt, West Germany) (100–10,000 Daltons) in distilled, deionized water and packed into a 2.20 cm i.d. glass column which gave a bed height of 74 cm. Elution of the column with distilled, deionized water (flow rate 2.00 mL/min, 7.5 psi $N_2$) gave twenty fractions. The volume, pH, colour, and hydrogen peroxide content of these fractions are given below.

| Fraction | Volume, mL | pH | Colour | $H_2O_2$, mg | Solids, mg |
|---|---|---|---|---|---|
| 1 | 20.0 | 7.42 | clear | — | — |
| 2 | 20.6 | 6.46 | clear | — | — |
| 3 | 20.0 | 6.98 | clear | — | — |
| 4 | 20.0 | 7.09 | clear | — | — |
| 5 | 20.0 | 7.16 | clear | — | — |
| 6 | 20.6 | 7.26 | f yellow | — | — |
| 7 | 20.0 | 7.21 | yellow | — | 21.2 |
| 8 | 20.0 | 7.13 | yellow | — | — |
| 9 | 20.0 | 7.07 | f yellow | — | — |
| 10 | 20.0 | 7.03 | f yellow | — | — |
| 11 | 20.0 | 7.00 | vf yellow | — | — |
| 12 | 20.0 | 7.54 | vf yellow | — | — |
| 13 | 20.0 | 7.72 | f yellow | — | 91.2 |
| 14 | 20.0 | 7.70 | f yellow | — | — |
| 15 | 20.0 | 7.74 | f yellow | 5.20 | — |
| 16 | 20.0 | 7.81 | vf yellow | 11.9 | — |
| 17 | 20.0 | 8.20 | vf yellow | 30.6 | — |
| 18 | 20.6 | 8.49 | clear | 26.3 | — |
| 19 | 20.0 | 8.49 | clear | — | — |
| 20 | 18.0 | 8.81 | clear | — | — |

Hydrogen peroxide recovered from the column, 74.0 mg, represents 97.6% of the hydrogen peroxide present in the original sample. Also, more than 90% of the hydrogen peroxide was obtained in three fractions, 16, 17, and 18. These three fractions have a total volume of 60.6 mL and the original sample volume was 25.0 mL.

Fractions 7 and 13 were freeze evaporated to dryness. Selected physical properties of the recovered solids are given below. The mass spectra were recorded at different probe temperatures, 350 C., respectively.

|  | Fraction 7 | Fraction 13 |
|---|---|---|
| Melting point: | 300° C. char | 270° C. (decomp.) |
| Infrared cm$^{-1}$: | 3400 s, broad | 3400 s, broad |
|  | 2920 w |  |
|  | 1600 s, broad | 1580 s, broad |
|  | 1400 s | 1430 s |
|  |  | 1050 m, 1030 m |
|  |  | 935 w, 860 m |
|  |  | 655 m, 615 w |
| MS, solid | m + 1 at 84 | m + 1 at 86 |
| inlet, C.I. | m + 29 at 113 | m + 29 at 115 |
|  | m + 41 at 125 | m + 41 at 127 |

EXAMPLE 6

Pulp Bleaching using Hydrogen Peroxide Recovered from Size Exclusion Chromatography of Freeze-concentrated Yellow Oil (a) Control brightening run An 8.94 g sample of previously freeze-dried pulp was bleached under these conditions; 5.00% hydrogen peroxide on pulp and 10% consistency. The hydrogen peroxide brightening solution was prepared as follows; to a chilled solution of 0.447 g of hydrogen peroxide (from stock solution) and 74 mL of distilled, deionized water was added a cold solution of 8.9 mg of magnesium sulphate, 0.313 g sodium silicate, and 0.313 g of sodium hydroxide in 6.4 mL of distilled, deionized water. The hydrogen peroxide brightening solution was then thoroughly mixed with the dried pulp and put into a 60° C. water bath for 90 minutes. The bleaching mixture was suction filtered and the pulp was soured with a solution of sulphur dioxide in water using the standard procedure, prior to storage at −20° C. until the brightness could be determined. The pulp filtrate from this bleaching, 47 mL, had a hydrogen peroxide content of 2.41 g/L and pH of 9.73.

(b) Bleaching using hydrogen peroxide recovered from yellow oil

A 8.94 g sample of previously freeze-dried pulp was bleached using the same ratio of hydrogen peroxide to pulp and the same consistency as described for the control above. The hydrogen peroxide brightening solution was prepared as follows; to a chilled solution of 9.447 g of recovered hydrogen peroxide (73 mL fractions 13+14 from both size exclusion chromatographies of Examples 3 and 4 above) was added a cold solution of 8.9 mg of magnesium sulphate, 0.313 g of sodium silicate, and 0.313 g of sodium hydroxide in 7.4 mL of distilled, deionized water. The brightening solution was then mixed thoroughly with the dried pulp and put into a 60° C. water bath for 90 minutes. The bleaching mixture was suction filtered and the pulp was soured using the standard procedure prior to storage at −20° C. until the brightness could be determined. The pulp filtrate from this bleaching, 44.5 mL, had a hydrogen peroxide content of 1.96 g/L and a pH of 9.42.

Some of the key results of the above bleachings are given below. The use of hydrogen peroxide recovered from size exclusion chromatography did not affect the final pulp brightness results. There is a small increase in the hydrogen peroxide consumption rate when using the recovered versus the stock hydrogen peroxide bleaching solution. This result accounts for the slightly lower than normal hydrogen peroxide residual and the slightly lower pH of the pulp filtrate obtained from the bleaching experiment which used recovered hydrogen peroxide. The higher peroxide consumption would be expected to yield a somewhat larger concentration of organic acid residues, which in turn would consume part of the alkaline buffer systems employed. This factor would effectively decrease the final pH of the spent brightening solution. The higher final solids content for the test run vs. the control is partly from inorganic salts and bases recovered with the hydrogen peroxide from the size exclusion chromatography, with a small contribution from the current bleaching test.

| Run | Residual $H_2O_2$, % | Brightness | Final pH | Solids Content g/L |
|---|---|---|---|---|
| 33–153 | 43.4 | 75.6 | 9.73 | 11.64 |
| 33–149 | 35.3 | 75.6 | 9.42 | 17.77 |

As will be apparent to those skilled in the art in light of the foregoing disclosure, many alterations and modifications are possible in the practice of the invention without departing from the spirit or scope thereof. Accordingly, the scope of the invention is to be construed in accordance with substance defined by the following claims.

We claim:

1. A method of separating coloured constituents from hydrogen peroxide in a coloured aqueous hydrogen peroxide solution, said solution containing coloured constituents having a higher molecular weight relative to that of hydrogen peroxide, comprising the steps of:

(a) introducing a batch of said coloured aqueous hydrogen peroxide solution into a mass of size exclusion medium comprising a plurality of pores through each particle, said pores being sufficiently large to permit hydrogen peroxide to pass through the pores and said pores being sufficiently small to substantially prevent entry or passage of said coloured constituents through the pores thereby causing said coloured constituents to pass through the medium more rapidly than the hydrogen peroxide;

(b) introducing a flow of liquid into said medium to elute said solution through said medium.

2. A method as described in claim 1, wherein said medium is tightly packed in a chromatographic column before the solution is passed through said medium.

3. A method as described in claim 1 wherein said particles are spherical in shape.

4. A method as described in claim 1, wherein said solution is received from the bleaching plant of a pulp mill.

5. A method as described in claim 1 wherein the liquid is water.

6. A method as described in claim 5 wherein said water is distilled and deionized.

7. A method as described in claim 1, wherein the molecular size accepted by said pores is about a maximum of $10 \times 10^6$ Daltons.

8. A method as described in claim 7, wherein the molecular size accepted by said pores is between about 100 and 10,000 Daltons.

9. A method as described in claim 1, wherein said particles are glycidylmethacrylate copolymers and derivatives thereof.

10. A method as described in claim 9, wherein said particles are oligoethylene glycol-glycidyldimethacrylatepentaerythritol dimethacrylate copolymers.

11. A method as described in claim 1 wherein the Ph of said solution and said liquid are about between 9 and 10.

12. A method as described in claim 1 wherein said solution contains up to 20% by weight of a miscible organic solvent.

13. The method as described in claim 1 wherein said solution is passed through said medium in a downward direction, that is in the direction of the force of gravity.

14. The method as described in claim 13 wherein, in the event that said pores become blocked with foreign matter, ceasing the flow of said solution and then passing distilled water through said medium in an upward direction, against the force of gravity, with sufficient force to raise and separate the particles in the medium for a predetermined period of time to remove the foreign matter from the medium.

* * * * *